United States Patent
Kipiani et al.

(10) Patent No.: US 12,359,005 B2
(45) Date of Patent: Jul. 15, 2025

(54) ZIEGLER-NATTA CATALYSTS FOR OLEFIN POLYMERIZATION

(71) Applicant: Borealis AG, Vienna (AT)

(72) Inventors: Georgy Kipiani, Porvoo (FI); Marja Mustonen, Porvoo (FI)

(73) Assignee: Borealis AG, Vienna (AT)

( * ) Notice: Subject to any disclaimer, the term of this patent is extended or adjusted under 35 U.S.C. 154(b) by 658 days.

(21) Appl. No.: 17/764,238

(22) PCT Filed: Oct. 1, 2020

(86) PCT No.: PCT/EP2020/077471
§ 371 (c)(1),
(2) Date: Mar. 28, 2022

(87) PCT Pub. No.: WO2021/064080
PCT Pub. Date: Apr. 8, 2021

(65) Prior Publication Data
US 2022/0363785 A1   Nov. 17, 2022

Related U.S. Application Data

(60) Provisional application No. 62/910,526, filed on Oct. 4, 2019.

(30) Foreign Application Priority Data

Oct. 4, 2019  (EP) .................................. 19201409

(51) Int. Cl.
| | | |
|---|---|---|
| C08F 4/64 | (2006.01) | |
| C08F 4/643 | (2006.01) | |
| C08F 4/651 | (2006.01) | |
| C08F 4/655 | (2006.01) | |
| C08F 10/02 | (2006.01) | |
| C08F 210/16 | (2006.01) | |

(52) U.S. Cl.
CPC .............. *C08F 4/643* (2013.01); *C08F 4/651* (2013.01); *C08F 4/655* (2013.01); *C08F 210/16* (2013.01); *C08F 2410/01* (2013.01)

(58) Field of Classification Search
CPC ................................ C08F 4/654; C08F 4/655
See application file for complete search history.

(56) References Cited

U.S. PATENT DOCUMENTS

| | | | |
|---|---|---|---|
| 4,071,674 A | 1/1978 | Kashiwa et al. | |
| 6,300,273 B1 * | 10/2001 | Sacchetti | C08F 10/00 526/348 |
| 6,683,017 B2 | 1/2004 | Gao et al. | |
| 2014/0148565 A1 * | 5/2014 | Denkwitz | C08F 10/00 502/172 |
| 2014/0378298 A1 | 12/2014 | Kipiani et al. | |

FOREIGN PATENT DOCUMENTS

| | | |
|---|---|---|
| CN | 102040684 A | 5/2011 |
| EP | 373999 A1 | 6/1990 |
| EP | 0376936 A2 | 7/1990 |
| EP | 0424049 A2 | 4/1991 |
| EP | 0428054 A1 | 5/1991 |
| EP | 0614467 A1 | 9/1994 |
| EP | 633270 A1 | 1/1995 |
| EP | 0655073 A1 | 5/1995 |
| EP | 0669347 A1 | 8/1995 |
| EP | 0688794 A1 | 12/1995 |
| EP | 0810235 A2 | 12/1997 |
| EP | 3083719 A1 | 10/2016 |
| JP | 4-96911 A * | 3/1992 |
| JP | 7-33815 A | 2/1995 |
| JP | 7-228629 A | 8/1995 |
| JP | 7-278221 A | 10/1995 |
| JP | 2015-503646 A | 2/2015 |
| WO | 9212182 A1 | 7/1992 |
| WO | 9618662 A1 | 6/1996 |
| WO | 9951646 A1 | 10/1999 |
| WO | 0155230 A1 | 8/2001 |
| WO | 2003106510 | 12/2003 |
| WO | 2003106514 | 12/2003 |
| WO | 2004055065 A1 | 7/2004 |
| WO | 2005118655 A1 | 12/2005 |
| WO | 2006063771 A1 | 6/2006 |
| WO | 2007051607 A1 | 5/2007 |
| WO | 2007096255 A1 | 8/2007 |
| WO | 2007147715 A1 | 12/2007 |
| WO | 2013098139 A1 | 7/2013 |
| WO | 2014004396 A1 | 1/2014 |
| WO | 2014096296 A1 | 6/2014 |

(Continued)

OTHER PUBLICATIONS

JP 4-96911 A (Mar. 30, 1992); machine translation. (Year: 1992).*
Notice of Reasons for Rejection for Japanese Application No. 2022-519696 Transmission Date Oct. 10, 2023, 2 pages.
International Search Report for PCT/EP2020/077471 mailed Dec. 2, 2020, 11 pages.
Barino et al., "Modeling of Isospecific Ti Sites in MgCl2 Supported Heterogeneous Ziegler-Natta Catalysts", Macromol. Theory Simul. 7, 1998, pp. 407-419.
Ferraro et al., "Advances in Ziegler-Natta Catalysts for Polypropylene", Kinetics and Catalysis, 2006, vol. 47, No. 2, pp. 176-185.
Nissinen, Ville, "The Rols of Multidentate Ether and Amine Electron Donors in the Crystal Structure Formation of Magnesium Chloride Supports", Dissertations, Department of Chemistry, University of Eastern Finland, No. 141, 2017, 55 pages.
Communication Pursuant to Article 93(3) EPC dated Dec. 11, 2024, 5 pages.

*Primary Examiner* — Rip A Lee
(74) *Attorney, Agent, or Firm* — Lowenstein Sandler LLP

(57) ABSTRACT

The present invention relates to substituted 2-iso-propyl-1, 3-dialkoxypropanes, and more particularly to their use as internal donors in Ziegler-Natta catalysts to obtain ethylene (co)polymers with desirable properties. The present disclosure further concerns use of Ziegler-Natta catalyst components comprising said substituted 2-iso-propyl-1,3-dimethoxypropanes and use of Ziegler-Natta catalysts in ethylene (co)polymerization comprising said Ziegler-Natta catalyst components.

13 Claims, 2 Drawing Sheets

(56) References Cited

FOREIGN PATENT DOCUMENTS

| | | | |
|---|---|---|---|
| WO | 2014096297 | A1 | 6/2014 |
| WO | 2016097193 | A1 | 6/2016 |
| WO | 2016124676 | A1 | 8/2016 |

\* cited by examiner

ZIEGLER-NATTA CATALYSTS FOR OLEFIN POLYMERIZATION

CROSS-REFERENCE TO RELATED APPLICATION(S)

The present application is a national stage entry under 35 U.S.C. § 371 of International Application No. PCT/EP2020/077471, filed on Oct. 1, 2020, which claims priority to European Patent Application No. 19201409.0, filed on Oct. 4, 2019 and U.S. Provisional Patent Application No. 62/910,526 filed on Oct. 4, 2019. The contents of these applications are hereby incorporated by reference in their entirety.

FIELD OF THE DISCLOSURE

The present invention relates to substituted 2-isopropyl-1,3-dialkoxypropanes, and more particularly to their use as internal donors in Ziegler-Natta catalysts to obtain olefin polymers, especially ethylene polymers with desirable properties, in particular regarding molecular weight distribution (MWD) and chemical composition distribution (CCD). The present disclosure further concerns Ziegler-Natta catalyst components comprising said substituted 2-isopropyl-1,3-dialkoxypropanes and Ziegler-Natta catalysts for ethylene (co)polymerization comprising said Ziegler-Natta catalyst components as well as a method for preparing the same and their use in providing ethylene (co)polymers.

BACKGROUND OF THE DISCLOSURE

Ziegler-Natta (ZN) type polyolefin catalysts are well known in the field of producing polyolefins, such as ethylene (co)polymers. Generally, the catalysts comprise at least a catalyst component formed from a transition metal compound of Group 4 to 6 of the Periodic Table (IUPAC, Nomenclature of Inorganic Chemistry, 2005), a metal compound of Group 1 to 3 of the Periodic Table (IUPAC), optionally a compound of Group 13 element of the Periodic Table (IUPAC), and optionally an internal electron donor. A ZN catalyst may also comprise further catalyst component(s), such as a cocatalyst and optionally an external electron donor.

Internal electron donor and internal donor have the same meaning and are interchangeable in this application. The same applies to an external electron donor and an external donor, respectively.

The catalyst composition used for the production of polyolefins, such as ethylene (co)polymers, determines i.a. the properties of the polymers. Thus, the catalyst composition allows for "tailoring" the properties of the produced polymers.

EP633270 A1 discloses the use of 1,3-diethers as external electron donors for the (co)polymerization of ethylene.

EP373999 A1 discloses a method for controlling the molecular weight distribution (MWD) of polyethylene homopolymers and copolymers using a Ziegler-Natta catalyst comprising an external electron donor selected from monoethers (e.g. tetrahydrofuran). It is suggested to add the monoether to the catalytic component in the presence of the cocatalyst, whereas it is strongly discouraged to contact the monoether and the catalytic component in the absence of the cocatalyst.

WO2007051607 A1 discloses another possibility of tailoring the properties of a multimodal ethylene polymer. An alkyl ether type internal electron donor, preferably tetrahydrofuran, is used to modify Ziegler-Natta catalyst component and to influence the molecular weight distribution (MWD) of a higher molecular weight (HMW) component.

WO2007096255 A1 discloses a solid catalyst component for the (co)polymerization of ethylene which comprises Ti, Mg, halogen and an internal electron donor compound belonging to 1,2-diethers.

WO2003106514 A2 discloses a process for the preparation of ethylene copolymers in the presence of a catalyst comprising the product obtained by contacting (i) a solid catalyst component comprising Mg, Ti, halogen and a 1,3-diether of formula $(ROCH_2)_2C(R_1)R_2$, where R is a $C_1$-$C_{10}$ hydrocarbon group, $R_1$ is methyl or ethyl, optionally containing a heteroatom and $R_2$ is a $C_4$-$C_{12}$ linear alkyl group optionally containing a heteroatom and (ii) an organo-Al compound.

WO2007147715 A1 discloses a catalyst component for the polymerization of olefins, which is obtained by a specific process, comprising Mg, Ti, halogen and 1,3-diethers as internal electron donors. The catalyst with 9,9-bis (methoxymethyl)fluorene as an internal electron donor is used for propylene polymerization.

WO2004055065 A1 discloses a solid catalyst component which comprises Ti, Mg, halogen, and an electron donor in specific molar ratios for the preparation of copolymers of ethylene with α-olefins, where said α-olefins are homogeneously distributed along the polymer chains. The electron donor (ED) is preferably ether, such as tetrahydrofuran. Said catalyst component is used in polymerization processes together with an alkyl aluminium compound and optionally with external electron donor. The optional external electron donor is said to be equal to or different from the ED used in catalyst component.

EP0376936 A2 discloses a $MgCl_2$-supported ZN catalyst, where spray-dried $MgCl_2$/alcohol carrier material is treated with a compound of group IA to IIIA (Groups 1, 2 and 13 of the Periodic Table according to IUPAC, Nomenclature of Inorganic Chemistry, 2005) then titanated with a titanium compound, optionally in the presence of internal electron donor. The optional internal donor compound (THF or di-isobutyl phthalate are given in those examples where internal electron was used) is added together with $TiCl_4$ or after adding $TiCl_4$. However, the activity of the donor-modified catalysts of EP0376936 A2 was much lower than the original catalyst without the donor. Moreover, during the donor treatment step, a 10 wt % solution of triethylaluminium and a number of hydrocarbon washes were used, which resulted in a large amount of organic solvent waste.

WO2014004396 A1 discloses a catalyst component, where bi-heterocyclic compounds are used as internal electron donor. The catalyst component is used in propylene polymerization.

WO2014096296 A1 discloses a supported Ziegler-Natta catalyst component comprising an internal donor selected from bi-(oxygen containing ring) compounds and use of such a catalyst component for preparing a catalyst system used in the polymerization of ethylene for producing high molecular weight polyethylene.

WO2013098139 A1 discloses a particulate Group 2 metal/transition metal olefin polymerization catalyst component, which is obtained by a specific process, comprising 1,3-diether compound as internal donor and the use of such a catalyst component for preparing a catalyst used in the polymerization of olefins, particularly propylene (co)polymerization, optionally with comonomers.

WO2016097193 A1 discloses a solid $MgCl_2$-based Ziegler-Natta catalyst component prepared by pre-treating a $MgCl_2$*mROH adduct with a compound of Group 13 element and an internal organic compound being a bicyclic ether and further treated with a transition metal compound of Group 4 to 6 for producing polyolefins. Further disclosed also is a preparation of said catalyst component as well as a Ziegler-Natta catalyst comprising said solid catalyst component, a Group 13 element compound as cocatalyst and optionally external additives.

Although much research and development work in Ziegler-Natta catalyst preparation has been accomplished, there is still room for further improvement. Further, nowadays health, safety and environment policies are an important factor in the production of catalysts and further polymers. In other words polymers must fulfill the strict health and environmental requirements of certain national and international institutions. One class of substances considered as potential harmful compounds is phthalates, which have been commonly used as internal electron donors in Ziegler-Natta type catalysts. In addition, tetrahydrofuran has been classified as a hazardous substance.

For these reasons, it is still desirable to find further internal donors for use in Ziegler-Natta catalysts which do not include phthalates and/or tetrahydrofuran and which provide desired polymer properties, e.g. high molecular weight. Further, from a commercial point of view, such catalysts should exhibit a reproducible morphology, composition and performance.

There is also a need to find a catalyst which is able to produce ethylene copolymers with wider melt flow rate (MFR) and density windows, such that there is the possibility to produce high molecular weight ethylene copolymers with narrow MWD (molecular weight distribution) and high comonomer content combined with low melting temperature.

Finally, the catalyst should demonstrate productivity on a level that makes it viable in commercial polymerization processes while producing polymers with a broad range of molecular weight.

Based on the teachings of prior art, it appears that donor modification might result in the improvement of some properties. However, very often these improvements are made at the expense of catalyst activity and comonomer response. In particular, $MgCl_2$-based catalysts prepared by precipitation methods are typically sensitive towards changes in preparation conditions.

BRIEF DESCRIPTION OF THE DISCLOSURE

An object of the present invention is to provide internal donors, and in particular, a Ziegler-Natta catalyst component comprising said internal donor, which overcomes the above disadvantages, is environmentally sustainable and supports the preparation of ethylene (co)polymers with a desirable molecular weight, molecular weight distribution (MWD) and chemical composition distribution (CCD).

The object of the present invention is achieved by use of compounds of formula (I) as internal donors, a Ziegler-Natta catalyst component comprising said internal donors, a Ziegler-Natta catalyst comprising the same, and use thereof in olefin polymerization, which are characterized by what is stated in the independent claims. The preferred embodiments of the invention are covered by the dependent claims.

DETAILED DESCRIPTION OF THE DISCLOSURE

Surprisingly it has now been found that the use of compounds of formula (I) as discussed herein and hereafter in Ziegler-Natta catalyst provides excellent activity—hydrogen response balance when utilized in (co)polymerization of ethylene. Additionally, their use provides ethylene (co)polymers with desired molecular weight, molecular weight distribution (MWD) and chemical composition distribution (CCD).

Internal Donor (i)

Accordingly provided herein is the use of a compound of formula (I) as an internal donor in a Ziegler-Natta catalyst, especially for ethylene (co)polymerization, in particular for producing an ethylene (co)polymer in a multi-stage process,

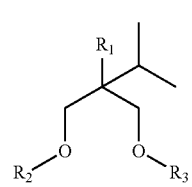

(I)

wherein
$R_1$ is $C_{4-10}$-alkyl; and
$R_2$ and $R_3$ are each independently $C_{1-3}$-alkyl.
The $C_{1-3}$-alkyl may be linear or branched.
Preferably, $R_1$ is linear or branched $C_{5-9}$-alkyl. More preferably, $R_1$ is selected from a group consisting of methylbutyl and nonyl. Even more preferably, $R_1$ is selected from a group consisting of 3-methylbutyl and nonyl. Preferably, $R_2$ and $R_3$ are each independently methyl or ethyl. More preferably, $R_2$ and $R_3$ are same and selected from methyl and ethyl.

In another preferred embodiment, $R_2$ and $R_3$ are each independently methyl or ethyl and $R_1$ is a linear $C_{5-10}$-alkyl. More preferably, $R_2$ and $R_3$ are each independently methyl or ethyl and $R_1$ is a linear $C_{8-10}$-alkyl. Even more preferable, $R_2$ and $R_3$ are same and selected from methyl and ethyl and $R_1$ is nonyl or decyl. In a particularly preferred embodiment, $R_2$ and $R_3$ are same and selected from methyl and ethyl and $R_1$ is nonyl.

Further preferred embodiments of the use of the present internal donor are described in the dependent claims as well as in the following description.

In a first example of the present use, the compound of formula (I) is selected from compounds of formula (I-a)

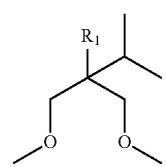

(I-a)

wherein
$R_1$ is $C_{4-10}$-alkyl.
Preferably, $R_1$ is linear or branched $C_{5-9}$-alkyl. More preferably, $R_1$ is selected from a group consisting of methylbutyl and nonyl. Even more preferably, $R_1$ is selected from a group consisting of 3-methylbutyl and nonyl.

Alternatively, $R_1$ is a linear $C_{5-10}$-alkyl, more preferably a linear $C_{8-10}$-alkyl. In this case, $R_1$ is particularly nonyl or decyl, wherein nonyl is more preferred.

In a second example, the compound of formula (I) is selected from compounds of formula (I-b)

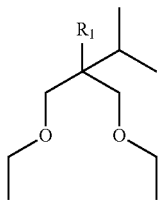

(I-b)

wherein $R_1$ is $C_{4-10}$-alkyl.

Preferably, $R_1$ is linear or branched $C_{5-9}$-alkyl. More preferably, $R_1$ is selected from a group consisting of methylbutyl and nonyl. Even more preferably, $R_1$ is selected from a group consisting of 3-methylbutyl and nonyl.

Alternatively, $R_1$ is a linear $C_{5-10}$-alkyl, more preferably a linear $C_{8-10}$-alkyl. In this case, $R_1$ is particularly nonyl or decyl, wherein nonyl is more preferred.

In a particular example the compound of formula (I) is selected from a group consisting of 2-(3-methylbutyl)-2-isopropyl-1,3-dimethoxypropane, 2-(3-methylbutyl)-2-isopropyl-1,3-diethoxypropane and 2-nonyl-2-isopropyl-1,3-diethoxypropane. Among the aforementioned compounds 2-nonyl-2-isopropyl-1,3-diethoxypropane is particularly preferred.

The compound according to formula (I) is preferably used for producing an ethylene (co)polymer with a molecular weight distribution (MWD) having a polydispersity index (PDI) of 3.8 to 4.3, preferably 4.0 to 4.2, and a weight average molecular weight Mw of 23,000 to 26,000 g/mol, preferably 24,000 to 25,000 g/mol.

In another preferred embodiment, the compound according to formula (I) is used for producing an ethylene-butylene-copolymer having a butylene content of 3.5 to 5.5 wt-%.

It is particularly preferred to use the compound according to formula (I) for producing an ethylene-butylene-copolymer having a butylene content of 3.5 to 5.5 wt-% and a low melting point Tm below 123.5° C., preferably below 123.0° C.

It has been surprisingly found that by using the present internal donor in a Ziegler-Natta catalyst, especially for ethylene (co)polymerization, in particular for producing ethylene (co)polymer in a multi-stage process, it is possible to produce multimodal polyethylene having desirable molecular weight, molecular weight distribution (MWD) and chemical composition distribution (CCD).

The improvements, such as the increase in molecular weight and/or the narrowing of MWD, are not made at the expense of the productivity of the catalyst. Instead, the productivity remains at an acceptable high level.

(A) Ziegler-Natta Catalyst Component

Provided herein is a Ziegler-Natta catalyst component for olefin polymerization, especially for ethylene (co)polymerization, in particular for producing ethylene (co)polymer in a multi-stage process, comprising an internal donor selected from compounds of formula (I)

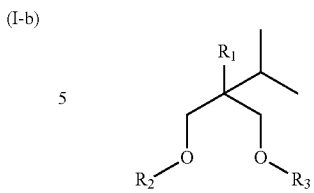

(I)

wherein $R_1$ is $C_{4-10}$-alkyl; and $R_2$ and $R_3$ are each independently $C_{1-3}$-alkyl.

The $C_{1-3}$-alkyl may be linear or branched.

Preferably, $R_1$ is linear or branched $C_{5-9}$-alkyl. More preferably $R_1$ is selected from a group consisting of methylbutyl and nonyl. Even more preferably, $R_1$ is selected from a group consisting of 3-methylbutyl and nonyl.

Preferably, $R_2$ and $R_3$ are each independently methyl or ethyl. More preferably, $R_2$ and $R_3$ are same and selected from methyl and ethyl.

In another preferred embodiment, $R_2$ and $R_3$ are each independently methyl or ethyl and $R_1$ is a linear $C_{5-10}$-alkyl. More preferably, $R_2$ and $R_3$ are each independently methyl or ethyl and $R_1$ is a linear $C_{8-10}$-alkyl. Even more preferable, $R_2$ and $R_3$ are same and selected from methyl and ethyl and $R_1$ is nonyl or decyl. In a particularly preferred embodiment, $R_2$ and $R_3$ are same and selected from methyl and ethyl and $R_1$ is nonyl.

Further preferred embodiments of the use of the present Ziegler-Natta catalyst component are described in the dependent claims as well as in the following description.

In a first example of the present use of the Ziegler-Natta catalyst component, the compound of formula (I) is selected from compounds of formula (I-a)

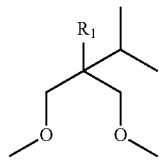

(I-a)

wherein $R_1$ is $C_{4-10}$-alkyl.

Preferably, $R_1$ is linear or branched $C_{5-9}$-alkyl. More preferably, $R_1$ is selected from a group consisting of methylbutyl and nonyl. Even more preferably, $R_1$ is selected from a group consisting of 3-methylbutyl and nonyl.

Alternatively, $R_1$ is a linear $C_{5-10}$-alkyl, more preferably a linear $C_{8-10}$-alkyl. In this case, $R_1$ is particularly nonyl or decyl, wherein nonyl is more preferred.

In a second example of the present use of the Ziegler-Natta catalyst component, the compound of formula (I) is selected from compounds of formula (I-b)

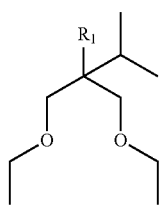

(I-b)

wherein

R$_1$ is C$_{4-10}$-alkyl.

Preferably, R$_1$ is linear or branched C$_{5-9}$-alkyl. More preferably, R$_1$ is selected from a group consisting of methylbutyl and nonyl. Even more preferably, R$_1$ is selected from a group consisting of 3-methylbutyl and nonyl.

Alternatively, R$_1$ is a linear C$_{5-10}$-alkyl, more preferably a linear C$_{8-10}$-alkyl. In this case, R$_1$ is particularly nonyl or decyl, wherein nonyl is more preferred.

In a particular example the compound of formula (I) is selected from a group consisting of 2-(3-methylbutyl)-2-isopropyl-1,3-dimethoxypropane, 2-(3-methylbutyl)-2-isopropyl-1,3-diethoxypropane and 2-nonyl-2-isopropyl-1,3-diethoxypropane. Among the aforementioned compounds 2-nonyl-2-isopropyl-1,3-diethoxypropane is particularly preferred.

Provided herein is also a Ziegler-Natta catalyst component as herein described.

The term "Ziegler-Natta catalyst component" as used herein and hereafter refers to a catalyst component, also called a procatalyst of a Ziegler-Natta catalyst and comprising at least a transition metal compound and an internal donor.

In particular, it refers to a catalyst component formed from (ii) a transition metal compound of Group 4 to 6 of the Periodic Table (IUPAC, Nomenclature of Inorganic Chemistry, 2005), (iii) a metal compound of Group 1 to 3 of the Periodic Table (IUPAC, 2005), (iv) optionally a compound of Group 13 or 14 of the Periodic Table (IUPAC, 2005) element, and (i) an internal donor selected from the compounds of formula (I), especially selected from compounds of formula (I-a) and (I-b).

Internal Donor (i)

The term "internal donor", also known as internal electron donor, as used herein and hereafter refers to a compound being part of the Ziegler-Natta catalyst component, i.e. added during the synthesis of the Ziegler-Natta catalyst component and typically acting as an electron donor in the Ziegler-Natta catalyst.

The internal donor is a part of the Ziegler-Natta catalyst component and is added into said Ziegler-Natta catalyst components during its preparation.

The loading (during the synthesis) molar ratio of internal donor (ID) to the compound of a metal of Group 1 to 3 (iii), in particular Mg, (ID/Mg), is preferably from 0.010 to 0.300 mol/mol and more preferably from 0.030 to 0.250 mol/mol and even more preferably from 0.090 to 0.170 mol/mol.

Other Compounds of the Ziegler-Natta Catalyst Component

In addition to the internal donor (i), the Ziegler-Natta catalyst component typically further comprises (ii) a compound of a transition metal of Group 4 to 6 of the Periodic Table (IUPAC, Nomenclature of Inorganic Chemistry, 2005);

(iii) a compound of a metal of Group 1 to 3 of the Periodic Table (IUPAC, 2005); and (iv) optionally, a compound of an element of Group 13 of the Periodic Table (IUPAC, 2005).

The Ziegler-Natta catalyst component is typically solid. The solid Ziegler-Natta catalyst component may be formed without using any external support material or it can be a solid supported Ziegler-Natta catalyst component.

The solid supported Ziegler-Natta catalyst component of the present invention comprises an internal donor selected from compounds of formula (I) as discussed herein;

(ii) a compound of a transition metal of Group 4 to 6 of the Periodic Table (IUPAC, Nomenclature of Inorganic Chemistry, 2005), in particular a titanium compound;

(iii) a compound of a metal of Group 1 to 3 of the Periodic Table (IUPAC, 2005), in particular a magnesium compound; and (iv) optionally, a compound of Group 13 element of the Periodic Table (IUPAC, 2005), in particular an aluminium compound;

wherein components (i) to (iv), when present, are supported on a solid support.

The solid support can be selected from a group consisting of an inorganic oxide solid support, such as silica, alumina, titania, silica-alumina, silica-titania, and a Mg-based solid support, such as a MgCl$_2$-based solid support. Preferably, the solid support is silica or a Mg-based solid support, such as a MgCl$_2$-based solid support, more preferably the solid support is solid support of particles of MgCl$_2$*mROH adduct, wherein R in the adduct MgCl$_2$*mROH is a linear or branched C$_{1-12}$-alkyl group, and m is 0 to 6, preferably 1 to 6. More preferably, m is 1 to 4.

The volume-based median particle size (D$_{v0.5}$) of a silica support is typically from 2 to 500 µm, preferably 5 to 200 µm, more preferably 10 to 100 µm. However, it has turned out that special advantages can be obtained, if the support has a D$_{v0.5}$ particle size from 5 to 30 µm, preferably from 7 to 20 µm, more preferably from 8 to 15 µm. Alternatively, the silica support may have a Do 5 particle size of from 20 to 80 µm, preferably from 20 to 30 µm. Examples of suitable support materials include, for instance, ES747JR, produced and marketed by Ineos Silicas (former Crossfield), and SP9-491, produced and marketed by Grace.

The catalyst can be prepared by sequentially contacting the carrier with the above mentioned compounds, as described e.g. in EP0688794 A1 and WO99/51646 A1. Alternatively, it can be prepared by first preparing a solution from the components and then contacting the solution with a carrier, as described in WO01/55230 A1.

Alternatively, the catalyst component used in the present invention may be supported on a Mg-based solid support, in particular MgCl$_2$. Thus, the catalyst comprises a titanium compound and optionally a compound of Group 13 element, for example an aluminium compound, on a magnesium dihalide, such as magnesium dichloride. A group of such Ziegler-Natta catalyst components comprise a titanium compound together with a magnesium halide compound acting as a support. Such catalysts are disclosed, for instance, in WO2005/118655 A1, EP0810235 A2, WO2014/096296 A1 and WO2016/097193 A1.

The catalyst may, for example, be prepared by contacting spheroidal or granular MgCl$_2$*mROH, such as MgCl$_2$*mEtOH, carrier material with an internal electron donor, selected from compounds of formula (I) in the beginning of the catalyst synthesis, i.e. prior to a treatment with the titanium compound (e.g. TiCl$_4$) or even prior to a treatment of the MgCl$_2$*mEtOH carrier material with a compound of Group 13 element and by finally recovering the solid catalyst component.

The median particle size Do 5 of a Mg-based solid support is typically from 2 to 500 µm, preferably 5 to 200 µm, more preferably 10 to 100 µm. However, it has turned out that special advantages can be obtained if the support has a Do 5 particle size from 5 to 30 µm, preferably from 7 to 25 µm, more preferably from 8 to 20 µm, or even from 8 to 15 µm. Alternatively, the support may have a Do 5 particle size of from 20a 80 µm, preferably from 20 to 30 µm. MgCl$_2$*mROH can be prepared by methods described in prior art. Preparation methods of MgCl$_2$*mROH carrier are described in several patents e.g. in EP0376936B1, EP0424049 B1, EP0655073 B1, U.S. Pat. No. 4,071,674 and EP0614467 B1, which are incorporated herein by reference.

Solid Ziegler-Natta catalyst components may alternatively be formed without using any external support material, such as silica, alumina or separately prepared Mg-based solid support, onto which active catalyst component are loaded. Instead, a solid catalyst is formed by a method where all active catalyst compounds are contacted and/or reacted in liquid form with each other, and, after that, the solid catalyst component is formed.

In an example of the present invention, the Ziegler-Natta catalyst component comprises
(i) an internal donor selected from compounds of formula (I) as discussed herein;
(ii) a Group 4 to 6 metal, preferably a Group 4 metal, more preferably Ti, content (determined by ICP Analysis) in the range of 1.0 wt % to 15.0 wt %, preferably 2.5 wt % to 12.0 wt %, more preferably 4.0 wt % to 9.0 wt % of the total weight of the Ziegler-Natta catalyst component;
(iii) a Group 1 to 3, preferably a Group 2 metal, more preferably Mg, content (determined by ICP Analysis) in the range of 5.0 wt % to 30.0 wt %, preferably 9.0 wt % to 22.0 wt %, more preferably 13.0 wt % to 17.0 wt % of the total weight of the Ziegler-Natta catalyst component;
(iv) an Al content (determined by ICP Analysis) in the range of 0 wt % to 3.0 wt %, preferably 0 wt % to 2.6 wt %, more preferably 0 wt % to 0.7 wt % of the total weight of the Ziegler-Natta catalyst component.

Further, the Ziegler-Natta catalyst component according to an embodiment of the present invention has a median particle size Do 5 in the range of 2 to 100 μm, preferably 5 to 30 μm, more preferably 8 to 20 μm, even more preferably 8 to 15 μm.

Transition Metal Compound of Group 4 to 6 (ii)

The compound of a transition metal of Group 4 to 6 of the Periodic Table (IUPAC, Nomenclature of Inorganic Chemistry, 2005), is preferably a compound of a transition metal of Group 4 of the Periodic Table (IUPAC, 2005), or a vanadium compound, more preferably a titanium or vanadium compound, even more preferably a titanium compound, yet even more preferably a halogen-containing titanium compound, most preferably a chlorine-containing titanium compound.

Particularly preferably the titanium compound is a halogen-containing titanium compound of the formula $Hal_yTi(OAlk)_{4-y}$, wherein Alk is a $C_{1-20}$-alkyl group, preferably a $C_{2-10}$-alkyl group, and more preferably a $C_{2-8}$-alkyl group, Hal is halogen, preferably chlorine and y is 1, 2, 3 or 4, preferably 3 or 4 and more preferably 4.

Suitable titanium compounds include trialkoxytitanium monochlorides, dialkoxytitanium dichloride, alkoxytitanium trichloride, and titanium tetrachloride. Preferably, titanium tetrachloride is used.

The amount of the compound of Group 4 to 6 in the Ziegler-Natta catalyst component is preferably such that the content of the Group 4 to 6 metal, preferably Group 4 metal, more preferably Ti (determined by ICP Analysis) is in the range of 1.0 wt % to 15.0 wt %, preferably 2.5 wt % to 12.0 wt %, more preferably 4.0 wt % to 9.0 wt % of the total weight of the Ziegler-Natta catalyst component. The amount of the compound of Group 4 to 6 metal is determined by ICP Analysis as described in the Experimental part.

Metal Compound of Group 1 to 3 Metal (iii)

The compound of Group 1 to 3 metal is preferably a compound of Group 2 metal of the Periodic Table (IUPAC, Nomenclature of Inorganic Chemistry, 2005), more preferably a magnesium compound.

The amount of the metal compound of Group 1 to 3 in the Ziegler-Natta catalyst component is preferably such that a Group 1 to 3 metal, preferably a Group 2 metal, more preferably Mg, content is in the range of 5.0 wt % to 30.0 wt %, preferably 9.0 wt % to 22.0 wt %, more preferably 13.0 wt % to 17.0 wt % of the total weight of the Ziegler-Natta catalyst component. The amount of the metal compound of Group 1 to 3 is determined by ICP Analysis as described in the Experimental part.

In a particular example the metal compound of Group 1 to 3 is provided in the form of a $MgCl_2$-based solid support, preferably solid support particles of $MgCl_2*mROH$ adduct, wherein R in the adduct $MgCl_2*mROH$ is a linear or branched $C_{1-12}$-alkyl group, and m is 0 to 6, preferably 1 to 6, more preferably 1 to 4.

Preferably, the final solid Ziegler-Natta catalyst component particles have a median particle size Do 5 in the range of 2 to 100 μm, preferably 5 to 30 μm, more preferably 8 to 20 μm, even more preferably 8 to 15 μm.

Compound of Group 13 Element (iv)

The optional compound of the Group 13 element of the Periodic Table (IUPAC, Nomenclature of Inorganic Chemistry, 2005) is preferably an aluminium compound.

Particularly preferably the aluminium compound is an aluminium compound of the formula $Al(alkyl)_xHal_{3-x}$(II), wherein each alkyl is independently an $C_{1-12}$-alkyl group, preferably $C_{1-8}$-alkyl group, more preferably $C_{1-6}$-alkyl group, Hal is halogen, preferably chlorine and $1<x\leq3$. The alkyl group can be linear, branched or cyclic, or a mixture of such groups.

Preferred aluminium compounds are alkylaluminium dichlorides, dialkylaluminium chlorides or trialkylaluminium compounds, for example dimethylaluminium chloride, diethylaluminium chloride, di-isobutylaluminium chloride, and triethylaluminium or mixtures thereof. Most preferably, the aluminium compound is a trialkylaluminium compound, especially triethylaluminium.

The amount of the compound of the Group 13 element in the Ziegler-Natta catalyst component is preferably such that the Group 13 element, preferably Al, content is in the range of 0 wt % to 3.0 wt %, preferably 0 wt % to 2.6 wt %, more preferably 0 wt % to 0.7 wt % of the total weight of the Ziegler-Natta catalyst component. The amount of the compound of Group 13 element is determined by ICP Analysis as described in the Experimental part.

The internal donor is a part of the Ziegler-Natta catalyst component and is added into said Ziegler-Natta catalyst component during the synthesis thereof.

The molar loading ratio (in the synthesis) of internal donor (ID) to the metal of Group 1 to 3 (iii), in particular Mg, (ID/Mg), is preferably from 0.010 to 0.300 mol/mol, more preferably from 0.030 to 0.250 mol/mol and even more preferably from 0.090 to 0.170 mol/mol.

The final Ziegler-Natta catalyst component typically has:
a Mg/Ti mol/mol ratio from 2.0 to 15.0, preferably from 2.5 to 12.0, more preferably from 3.0 to 6.0;
an Al/Ti mol/mol ratio from 0 to 1.0, preferably from 0 to 0.8, more preferably from 0 to 0.2; and
a Cl/Ti mol/mol ratio from 5.0 to 30.0, preferably from 6.0 to 27.0, more preferably from 9.0 to 15.0.

Method for Producing the Ziegler-Natta Catalyst Component

Generally, the present Ziegler-Natta catalyst component as defined herein is produced by adding the present internal donor, i.e. compound of formula (I), to a process of preparing the Ziegler-Natta catalyst component. This may be accomplished by manners and under conditions that are well known to the person skilled in the art of making Ziegler-Natta catalysts.

Accordingly, provided herein is a method for producing a Ziegler-Natta catalyst component, in particular a Ziegler-Natta catalyst component as defined herein, comprising a step of adding an internal donor of formula (I) as defined herein to a process of preparing the Ziegler-Natta catalyst component.

A solid Ziegler-Natta catalyst component can, for example, be prepared by sequentially contacting a solid support, such as silica, alumina or separately prepared Mg-based solid support, such as $MgCl_2$-based solid support, with the above-mentioned compounds, as described in EP0376936 A1, EP0688794 A1 or WO99/51646 A1. Alternatively, it can be prepared by first preparing a solution from the components and then contacting the solution with a solid support, as described in WO01/55230 A1.

In a particular example of the present method, the method for producing the Ziegler-Natta catalyst component comprises the steps of
- (M-a) providing a solid support, preferably $MgCl_2$-based solid support, more preferably solid support particles of $MgCl_2$*mROH adduct, wherein R in the $MgCl_2$*mROH adduct is a linear or branched $C_{1-12}$-alkyl group, and m is 0 to 6, preferably 1 to 6, more preferably 1 to 4;
- (M-b) pre-treating the solid support particles of step (M-a) with a compound of a Group 13 element;
- (M-c) treating the pre-treated solid support particles of step (M-b) with a transition metal compound of Group 4 to 6;
- (M-d) recovering the Ziegler-Natta catalyst component;

wherein the solid support is contacted with an internal organic compound of formula (I) or mixtures therefrom before treating the solid support in step (M-c).

The compound of formula (I), as defined herein, may be added to the catalyst mixture before, during or after the pre-treating of the solid support with the compound of Group 13 element, but before treating it with the compound of a transition metal of Group 4 to 6.

Solid Ziegler-Natta catalyst components may also be formed without using any external support material, like silica, alumina or separately prepared Mg-based solid support, onto which active catalyst component are loaded. In this case, a solid catalyst is formed by a method where all active catalyst compounds are contacted and/or reacted in liquid form with each other, and after that the solid catalyst is formed. The solid Ziegler-Natta catalyst components may be formed via emulsion-solidification or via precipitation method. Whether a Ziegler-Natta catalyst component is formed via emulsion-solidification or via precipitation method depends on the conditions, especially on the temperature used during contacting the compounds. In the emulsion-solidification method the compounds of the Ziegler-Natta catalyst component form a dispersed, i.e. a discontinuous phase in the emulsion of at least two liquid phases. The dispersed phase, in the form of droplets, is solidified from the emulsion, wherein the Ziegler-Natta catalyst component in the form of solid particles is formed. The principles of preparation of these types of catalysts are given e.g. in WO2003/106510 A1, WO2013/098139 A1 and WO2014/096297 A1.

Ziegler-Natta Catalyst

Accordingly further provided herein is a Ziegler-Natta catalyst for olefin polymerization, in particular for ethylene (co)polymerization, comprising the catalyst component as herein defined wherein the catalyst component comprises an internal donor selected from compounds of formula (I). Accordingly further provided herein is use of a Ziegler-Natta catalyst for olefin polymerization, in particular for ethylene (co)polymerization, comprising a Ziegler-Natta catalyst component comprising an internal donor selected from compounds of formula (I)

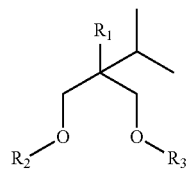

(I)

wherein
$R_1$ is $C_{4-10}$-alkyl; and
$R_2$ and $R_3$ are each independently $C_{1-3}$-alkyl.

The $C_{1-3}$-alkyl may be linear or branched. Preferably, $R_1$ is linear or branched $C_{5-9}$-alkyl. More preferably, $R_1$ is selected from a group consisting of methylbutyl and nonyl. Even more preferably, $R_1$ is selected from a group consisting of 3-methyl butyl and nonyl.

Preferably, $R_2$ and $R_3$ are each independently methyl or ethyl. More preferably, $R_2$ and $R_3$ are same and selected from methyl and ethyl.

In another preferred embodiment, $R_2$ and $R_3$ are each independently methyl or ethyl and $R_1$ is a linear $C_{5-10}$-alkyl. More preferably, $R_2$ and $R_3$ are each independently methyl or ethyl and $R_1$ is a linear $C_{8-10}$-alkyl. Even more preferable, $R_2$ and $R_3$ are same and selected from methyl and ethyl and $R_1$ is nonyl or decyl. In a particularly preferred embodiment, $R_2$ and $R_3$ are same and selected from methyl and ethyl and $R_1$ is nonyl.

Preferred embodiments of the use of the present Ziegler-Natta catalyst are described in the dependent claims as well as in the following description.

In a first example of the present Ziegler-Natta catalyst and use thereof, the compound of formula (I) is selected from compounds of formula (I-a)

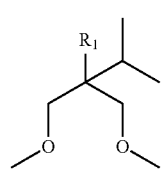

(I-a)

wherein
$R_1$ is $C_{4-10}$-alkyl.

Preferably, $R_1$ is linear or branched $C_{5-9}$-alkyl. More preferably, $R_1$ is selected from a group consisting of methylbutyl and nonyl. Even more preferably, $R_1$ is selected from a group consisting of 3-methylbutyl and nonyl.

Alternatively, $R_1$ is a linear $C_{5-10}$-alkyl, more preferably a linear $C_{8-10}$-alkyl. In this case, $R_1$ is particularly nonyl or decyl, wherein nonyl is more preferred.

In a second example the present Ziegler-Natta catalyst and use thereof, the compound of formula (I) is selected from compounds of formula (I-b)

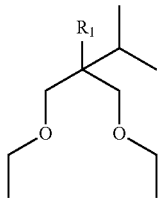

(I-b)

wherein

R$_1$ is C$_{4-10}$-alkyl.

Preferably, R$_1$ is linear or branched C$_{5-9}$-alkyl. More preferably, R$_1$ is selected from a group consisting of methylbutyl and nonyl. Even more preferably, R$_1$ is selected from a group consisting of 3-methylbutyl and nonyl.

Alternatively, R$_1$ is a linear C$_{5-10}$-alkyl, more preferably a linear C$_{8-10}$-alkyl. In this case, R$_1$ is particularly nonyl or decyl, wherein nonyl is more preferred.

In a particular example the compound of formula (I) is selected from a group consisting of 2-(3-methylbutyl)-2-isopropyl-1,3-dimethoxypropane, 2-(3-Methylbutyl)-2-isopropyl-1,3-diethoxypropane and 2-Nonyl-2-isopropyl-1,3-diethoxypropane. Among those, 2-Nonyl-2-isopropyl-1,3-diethoxypropane is particularly preferred.

Provided is also a Ziegler-Natta catalyst as herein disclosed.

In particular, the present Ziegler-Natta catalyst comprises
(A) a Ziegler-Natta catalyst component as defined herein;
(B) a cocatalyst selected from element compounds of Group 13 element of the Periodic Table (IUPAC, 2005); and
(C) optionally an external donor.

(B) Cocatalyst (II)

A Ziegler-Natta catalyst is typically used together with a cocatalyst, also known as activator. Suitable cocatalysts are compounds of element of Group 13 of the Periodic Table (IUPAC, 2005), typically Group 13 element C$_{1-16}$-alkyl compounds and especially aluminium C$_{1-16}$-alkyl compounds. These compounds include trialkyl aluminium compounds, such as trimethylaluminium, triethylaluminium, triisobutylaluminium, trihexylaluminium and tri-n-octylaluminium, alkyl aluminium halides, such as ethylaluminium dichloride, diethylaluminium chloride, ethylaluminium sesquichloride, dimethylaluminium chloride and the like. Especially preferred activators are trialkylaluminiums, of which triethylaluminium, trimethylaluminium and tri-isobutylaluminium are particularly used.

The amount in which the cocatalyst is used depends on the specific catalyst and the cocatalyst. Typically, e.g. triethylaluminium is used in such amount that the molar ratio of aluminium to the transition metal, such as Al/Ti, is from 1 to 1000, preferably from 3 to 100 and in particular from about 5 to about 30 mol/mol.

(C) External Donor

The catalyst of the invention may also comprise an external donor. External donors that can be used include ether compounds, typically tetrahydrofuran, siloxane or silane type of external donors and/or alkyl halides are is known from the prior art. External donors are also called as external electron donors. External electron donors are not part of the solid catalyst component, but are fed to the polymerization process as a separate component.

Polymerization of Olefins

The present Ziegler-Natta catalyst components as defined herein, in particular Ziegler-Natta catalysts as defined herein are intended for polymerizing olefins, preferably ethylene, optionally with C$_{2-20}$ comonomers.

Accordingly provided herein is the use of Ziegler-Natta catalyst component as defined herein or a Ziegler-Natta catalyst as defined herein in polymerizing olefins, preferably ethylene with C$_{2-20}$ comonomers.

Furthermore, provided herein is a method of olefin polymerization, in particular of ethylene (co) polymerization, which comprises introducing into a polymerization reactor a Ziegler-Natta catalyst, the Ziegler-Natta catalyst comprising a Ziegler-Natta catalyst component as defined herein.

Preferably, a Ziegler-Natta catalyst component as defined herein or a Ziegler-Natta catalyst as defined herein is used for polymerising ethylene optionally with one or more comonomers. Commonly used comonomers are α-olefin comonomers. The α-olefin comonomers are preferably selected from C$_{3-20}$-α-olefins, more preferably from C$_{4-10}$-α-olefins, such as 1-butene, isobutene, 1-pentene, 1-hexene, 4-methyl-1-pentene, 1-heptene, 1-octene, 1-nonene and 1-decene, as well as dienes, such as butadiene, 1,7-octadiene and 1,4-hexadiene, or cyclic olefins, such as norbornene, and any mixtures thereof. Most preferably, the comonomer is 1-butene and/or 1-hexene.

The catalyst of the present invention allows for the production of a wide range of polyethylene (co)polymers. Thus, production of high density, medium density and low density ethylene (co)polymers is possible.

If copolymers are the desired end-products, the comonomer content of the ethylene copolymers can vary in wide ranges depending on the desired polymer properties. Thus, the comonomer content can vary from 0.1 wt % to 20 wt %, preferably 0.5 wt % to 15 wt % and more preferably from 1.0 wt % to 10 wt %.

Further provided herein is a process for producing ethylene homo- or copolymers, comprising the steps of
(P-a) introducing the Ziegler-Natta catalyst component as defined herein into a polymerization reactor,
(P-b) introducing a cocatalyst capable of activating said Ziegler-Natta catalyst component into the polymerization reactor;
(P-c) introducing ethylene, optionally C$_3$-C$_{20}$α-olefin comonomers, and optionally hydrogen into the polymerization reactor; and
(P-d) maintaining said polymerization reactor in such conditions as to produce an ethylene homo- or copolymer.

The catalyst may be transferred into the polymerization zone by any means known in the art. It is thus possible to suspend the catalyst in a diluent and maintain it as homogeneous slurry. It is especially preferred to use oil having a viscosity from 20 to 1500 mPa·s as diluent, as disclosed in WO2006/063771 A1. It is also possible to mix the catalyst with a viscous composition of grease and oil and feed the resultant paste into the polymerization zone. Further still, it is possible to let the catalyst settle and introduce portions of thus obtained catalyst mud into the polymerization zone in a manner disclosed, for instance, in EP0428054 A1.

The polymerization process used according to the present invention comprises at least one gas phase reactor, or at least one slurry reactor or a combination of at least one slurry and at least one gas phase reactor.

The polymerization in slurry usually takes place in an inert diluent, typically a hydrocarbon diluent such as methane, ethane, propane, n-butane, isobutane, pentanes, hexanes, heptanes, octanes etc., or their mixtures. Preferably, the diluent is a low-boiling hydrocarbon having from 1 to 4 carbon atoms or a mixture of such hydrocarbons. An especially preferred diluent is propane, possibly containing minor amount of methane, ethane and/or butane.

The temperature in the slurry polymerization is typically from 40 to 115° C., preferably from 60 to 110° C. and in particular from 70 to 100° C. The pressure is from 1 to 150 bar, preferably from 10 to 100 bar.

The slurry polymerization may be carried out in any known reactor used for slurry polymerization. Such reactors include a continuous stirred tank reactor and a loop reactor. It is especially preferred to conduct the polymerization in loop reactor. Hydrogen is fed, optionally, into the reactor to control the molecular weight of the polymer as known in the art.

Furthermore, one or more alpha$\alpha$-olefin comonomers may be added into the reactor to control the density and morphology of the polymer product. The actual amount of such hydrogen and comonomer feeds depends on the desired melt index (or molecular weight) and density (or comonomer content) of the resulting polymer.

The polymerization in gas phase may be carried out in a fluidized bed reactor, in a fast-fluidized bed reactor or in a settled bed reactor or in any combination of these.

Typically, the fluidized bed or settled bed polymerization reactor is operated at a temperature within the range of from 50 to 100° C., preferably from 65 to 90° C. The pressure is suitably from 10 to 40 bar, preferably from 15 to 30 bar.

In addition, antistatic agent(s) may be introduced into the slurry and/or gas phase reactor if needed.

The process may further comprise pre- and post-reactors.

The polymerization steps may be preceded by a pre-polymerization step. The pre-polymerization step may be carried out in slurry or in gas phase. Preferably, pre-polymerization is carried out in slurry, and especially in a loop reactor. The temperature in the pre-polymerization step is typically from 0 to 90° C., preferably from 20 to 80° C. and more preferably from 30 to 70° C.

The pressure is not critical and is typically from 1 to 150 bar, preferably from 10 to 100 bar.

The polymerization may be carried out continuously or batch-wise, preferably the polymerization is carried out continuously.

A preferred multi-stage process for producing ethylene (co)polymers according to the invention comprises a slurry phase polymerization stage and a gas phase polymerization stage. Each stage can comprise one or more polymerization reactors. One suitable reactor configuration comprises one to two slurry reactors, preferably loop reactors and one gas phase reactor. Such polymerization configuration is described e.g. in patent literature, such as in WO92/12182 A1 and WO96/18662 A1 of Borealis and known as Borstar technology.

In a first example of the present process, (co)polymerizing ethylene is accomplished in a multi-stage polymerization process comprising at least one gas phase reactor for producing ethylene (co)polymers.

In a second example of the present process, (co)polymerizing ethylene is accomplished in a multi-stage polymerization process comprising at least one slurry reactor, preferably two slurry reactors, and one gas phase reactor.

Polymer Properties

By utilizing the present internal donor in a Ziegler-Natta catalyst component in a polymerization process according to the present invention it is possible to produce ethylene (co)polymers having desirable molecular weight, molecular weight distribution (MWD) and chemical composition distribution (CCD) while keeping the productivity on a good level as shown by the below examples.

The molecular weight, molecular weight distribution (MWD) and chemical composition distribution (CCD) of the produced polymer can be optimized by utilization of the present internal donors in Ziegler-Natta catalysts.

Further, the improvements, such as the increase in molecular weight, the improvement in chemical composition distribution and the narrowing of MWD, are not made at the expense of the productivity of the catalyst, but the productivity remains at an acceptable level. Thus, the performance of Ziegler-Natta catalysts comprising the present internal donors renders the improvements, such as the increase in molecular weight, the improvement in chemical composition distribution and the narrowing of MWD, which are not obtained at the expense of the productivity of the catalyst, but the productivity remains at a good level.

Especially an optimal combination of hydrogen response, MWD, comonomer response, chemical composition distribution (CCD) and activity and productivity makes the utilization of the present internal donors in Ziegler-Natta catalysts very attractive for producing polyethylene (co) polymers.

The advantages of the present invention are shown in the experimental part and in the figures.

EXPERIMENTAL PART

Analytical Methods

Figure 1:
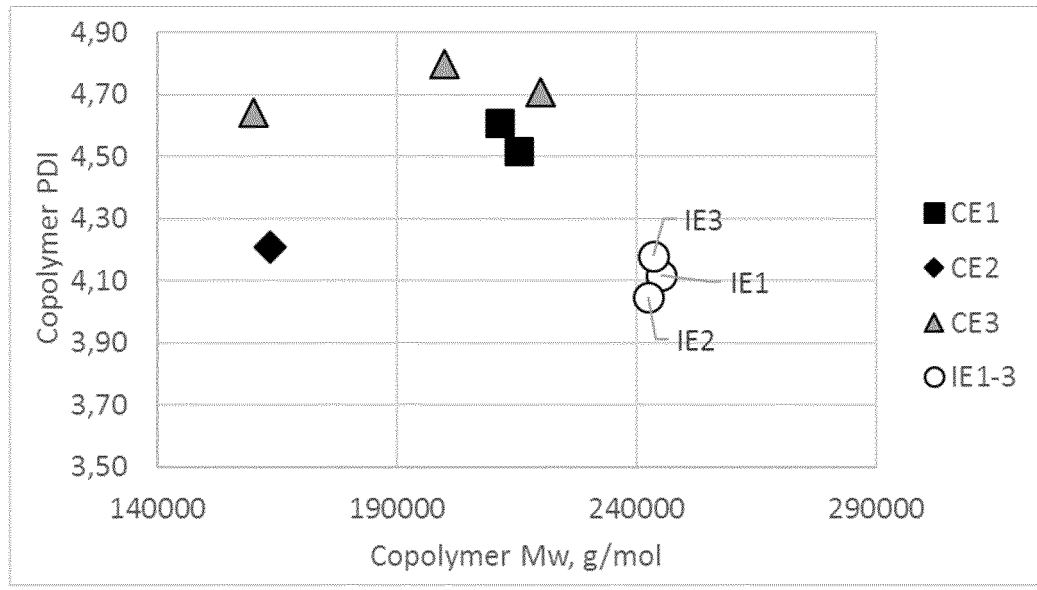
FIG. 1 shows the polydispersity index (PDI) vs. molecular weight of inventive examples (IE1-IE3) and comparative examples CE1 and CE2.

Al, Mg, Ti contents in a catalyst component by ICP-OES

The sample consisting of dry catalyst component powder is mixed so that a representative test portion can be taken. Approximately 20-50 mg of material is sampled in inert atmosphere into a 20 mL volume vial and the exact weight of powder recorded.

A test solution of known volume (V) is prepared in a volumetric flask as follows. Sample digestion is performed in the cooled vial by adding a small amount of deionized and distilled (DI) water (5% of V), followed by adding concentrated nitric acid (65% $HNO_3$, 5% of V). The mixture is transferred into a volumetric flask. The solution diluted with DI water up to the final volume V, and left to stabilise for two hours.

The elemental analysis of the resulting aqueous samples is performed at room temperature using a Thermo Elemental iCAP 6300 Inductively Coupled Plasma-Optical Emission Spectrometer (ICP-OES). The instrument is calibrated for Al, Ti and Mg using a blank (a solution of 5% $HNC_3$) and six standards of 0.5 ppm, 1 ppm, 10 ppm, 50 ppm, 100 ppm and 300 ppm of Al, Ti and Mg in solutions of 5% $HNO_3$ DI water. Curvelinear fitting and 1/concentration weighting is used for the calibration curve.

Immediately before analysis the calibration is verified and adjusted (instrument function named "re-slope") using the blank and a 300 ppm Al, 100 ppm Ti, Mg standard. A quality control sample (QC; 20 ppm Al and Ti, 50 ppm Mg in a solution of 5% $HNC_3$ in DI water) is run to confirm the re-slope. The QC sample is also run after every 5$^{th}$ sample and at the end of a scheduled analysis set.

The content of magnesium is monitored using the 285.213 nm line and the content for titanium using 336.121 nm line. The content of aluminium is monitored via the 167.079 nm line, when Al concentration in test portion is between 0-10 wt % and via the 396.152 nm line for Al concentrations above 10 wt %.

The reported values are an average of results of three successive aliquots taken from the same sample and are related back to the original catalyst sample based on input into the software of the original weight of test portion and the dilution volume.

Cl Content in a Catalyst Component by Potentiometric Titration

Chloride content of catalyst components is determined by titration with silver nitrate. A test portion of 50-200 mg of a catalyst component is weighed under nitrogen in a septum-sealed vial. A solution of 1 part of concentrated $HNC_3$ (68%, analytical grade) and 4 parts of deionized and distilled (DI) water are added to the sample in an aliquot of 2.5 mL using a syringe. After the reaction completion and dissolution of the catalyst component material, the solution is transferred into a titration cup using an excess of DI water. The solution is then immediately titrated with a commercially certified solution of 0.1M $AgNO_3$ in a Mettler Toledo T70 automatic titrator. The titration end-point is determined using an Ag-electrode. The total chloride amount is calculated from the titration and related to the original sample weight.

Volatiles in a Catalyst Component by GC-MS

A test solution using a 40-60 mg test portion of catalyst component powder is prepared by liquid-liquid extraction of the sample and internal standard in water and dichloromethane: first, 10 mL of dichloromethane are added to the test portion, followed by addition of 1 mL of the internal standard solution (dimethyl pimelate, 0.71 vol % in deionized water) using a precision micro-syringe. The suspension is sonicated for 30 min and left undisturbed for phase separation. A portion of the test solution is taken from the organic phase and filtered using a 0.45 μm syringe filter.

For the calibration, five standard stock solutions with different analyte concentrations are prepared by dosing five increasing portions of analyte standard materials accurately into volumetric flasks and filling up to mark with methanol. For the preparation of the calibration samples, aliquots of 200 μL from the stock solutions are extracted with the aqueous ISTD solution and dichloromethane in the same volume ratios as for the samples. The analyte amount in the final calibration samples ranges from 0.1 mg to 15 mg.

The measurement is performed using an Agilent 7890B Gas Chromatograph equipped with an Agilent 5977A Mass Spectrometer Detector. The separation is achieved using a ZB-XLB-HT Inferno 60 m×250 μm×0.25 μm column (Phenomenex) with midpoint backflush through a three channel auxiliary EPC and a pre-column restriction capillary of 3 m×250 μm×0 μm. The initial oven temperature is 50° C. and the hold time is 2 min. The oven ramp consists of a first stage of 5° C./min to 150° C. and a second stage of 30° C./min to 300° C. followed by a 1 min post-run backflush at 300° C.

The inlet operates in split mode. Injection volume is 1 μL, inlet temperature 280° C., septa purge 3 mL/min, total flow 67.875 mL/min and split ratio 50:1. Carrier gas is 99.9996% He with pre-column flow of 1.2721 mL/min and additional flow of 2 mL/min from the backflush EPC to the analytical column. The MS detector transfer line is kept at 300° C. The MSD is operated in Electron Impact mode at 70 eV and Scan mode ranging from 15-300 m/z.

The signal identities are determined by retention times (heptane 4.8, toluene 6.3, dimethyl-pimelate 23.2) and target ion m/z (heptane 71.1, toluene 91.1, dimethyl pimelate 157.1). Additionally, qualifier ions are used for confirmation of the identification (heptane, toluene). The target ion signals of each analyte and the internal standard are integrated and compared to calibration curve, established in the beginning of each run with the five calibration samples. The calibration curves for the response ratios are linear without sample concentration weighting. A quality control sample is used in each run to verify the standardization. All test solutions are run in two replicate runs. The mass of the test portion is used for calculating the analyte concentration in the sample for both replicates and the result reported as the average.

Polymer Melting and Crystallization Properties by DSC

Polymer Differential Scanning calorimetry analysis (DSC) is performed using a Mettler Toledo DSC2 on 5-10 mg samples. The polymer powder or pellet cut or MFR string cut sample is placed in a 40 μL aluminium pan, weighed to the nearest 0.01 mg and the pan is sealed with a lid. DSC is run according to ISO 11357-3 or ASTM D3418 in a heat/cool/heat run cycle with a scan rate of 10° C./min. The flow of nitrogen purge gas is set to 50-80 mL/min. The temperature range of the first heating run is 30° C. to 180° C. The temperature range of the cooling run and the second heating run is 180° C. to 0° C. (or lower). The isotherm times for the first heating run and the cooling run are 5 min. The first melting run is used to remove the thermal history of the sample. Crystallization temperature ($T_c$) is determined from the cooling run, while main melting temperature ($T_m$), degree of crystallinity (Cryst. %) and heat of melting ($H_m$) are determined from the second heating run.

Polymer Melt Flow Rate

The melt flow rates are measured in accordance with ISO 1133 at 190° C. and under given load and is indicated in units of grams/10 minutes. The melt flow rate is an indication of the molecular weight of the polymer. The higher the melt flow rate, the lower the molecular weight of the polymer.

$MFR_{21}$: 190° C., 21.6 kg load

Molecular Weight Averages, Molecular Weight Distribution (Mn, Mw, Mz, MWD, PDI)

Molecular weight averages ($M_z$, $M_w$ and $M_n$), Molecular Weight Distribution (MWD) and its broadness, described by polydispersity index $PDI=M_w/M_n$ (wherein $M_n$ is the number average molecular weight and $M_w$ is the weight average molecular weight) are determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i/M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i/M_i)} \quad (3)$$

For a constant elution volume interval $\Delta V_i$, where $A_i$, and $M_i$, are the chromatographic peak slice area and polyolefin molecular weight (MW), respectively associated with the elution volume, $V_i$ where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3×Agilent-PLgel Olexis and 1× Agilent-PLgel Olexis Guard columns is used. As the solvent and mobile phase 1,2,4-trichlorobenzene (TCB) stabilised with 250 mg/L 2,6-Di-tert-butyl-4-methyl-phenol) is used. The chromatographic system is operated at 160° C. and at a constant flow rate of 1 mL/min. 200 μL of sample solution is injected per analysis. Data collection is performed using either Agilent Cirrus software version 3.3 or PolymerChar GPC-IR control software.

The column set is calibrated using universal calibration (according to ISO 16014-2:2003) with 19 narrow MWD polystyrene (PS) standards in the range of 0.5 kg/mol to 11500 kg/mol. The PS standards are dissolved at room temperature over several hours. The conversion of the polystyrene peak molecular weight to polyolefin molecular weights is accomplished by using the Mark Houwink equation and the following Mark Houwink constants:

$K_{PS}=19\times10^{-3}$ mL/g, $\eta_{PS}=0.655$
$K_{PE}=39\times10^{-3}$ mL/g, $\eta_{PE}=0.725$
$K_{PP}=19\times10^{-3}$ mL/g, $\eta_{PP}=0.725$ A third order polynomial fit is used to fit the calibration data.

All samples are prepared in the concentration range of 0.5–1 mg/mL and dissolved at 160° C. for 2.5 hours for PP or 3 hours for PE under continuous gentle shaking.

Polymer Comonomer Content (1-Butene) by FTIR

Comonomer content is determined based on Fourier transform infrared spectroscopy (FTIR) using Bruker Tensor 37 spectrometer together with OPUS software.

Approximately 0.3 grams of sample is compression-moulded into films with thickness of 250 μm. Silicone paper is used on both sides of the film. The films are not touched by bare hands to avoid contamination. The films are pressed by using Fontijne Press model LabEcon 300. The moulding is carried out at 160° C. with 2 min pre-heating+2 min light press+1 min under full press. The cooling is done under full press power for 4 minutes.

The butene comonomer content is determined from the absorbance at the wave number of approximately 1378 cm$^{-1}$ and the reference peak is 2019 cm$^{-1}$. The analysis is performed using a resolution of 2 cm$^{-1}$, wave number span from 4000 to 400 cm$^{-1}$ and the number of sweeps of 128. At least two spectra are obtained from each film.

The comonomer content is determined from a spectrum from the wave number range of 1400 cm$^{-1}$ to 1330 cm$^{-1}$. The baseline is determined using the following method: within the set wavenumber range, the highest peak is located and then the minima to the left and to the right of this highest peak. The baseline connects these minima. The absorbance value at the highest peak is divided by the area of the reference peak.

The calibration plot for the method is produced for each comonomer type separately. The comonomer content of an unknown sample needs to be within the range of the comonomer contents of the calibration samples. The comonomer content in the calibration sample materials is pre-determined by NMR-spectrometry.

The comonomer content is calculated automatically by using calibration curve and the following formula:

$$WE=C_1 \times A0+C0$$

where
WE=result in wt %
A0=absorbance of the measured peak (AQ) to the area of the reference peak (AR);
C1=slope of the calibration curve;
C0=offset of the calibration curve.

The comonomer content is determined from both of the obtained spectra and the value is calculated as the average of these results.

EXAMPLES

Comparative Internal Donors

CD1: 9,9-Di(methoxymethyl)fluorene (DMMF)

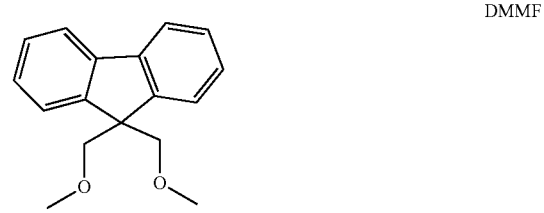 [SMILES: COCC1(COC)c2ccccc2-c2ccccc21]

DMMF 9,9-Di(methoxymethyl)fluorene (CAS 182121-12-6), alternatively named 9,9-Bis(methoxymethyl)-9H-fluorene, was acquired from Hangzhou Sage Chemical Co.

CD2: 2,2-Dimethyl-1,3-diglycidyloxypropane (DMDGP)

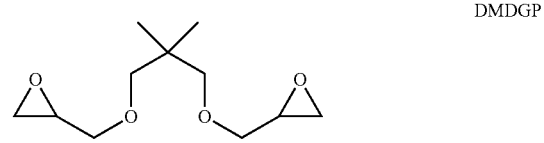

DMDGP 2,2-Dimethyl-1,3-diglycidyloxypropane (CAS 17557-23-2), alternatively named Diglycidyl ether of neo-pentyl glycol, was acquired from ABCR.

Inventive Internal Donors

ID1: 2-(3-Methylbutyl)-2-isopropyl-1,3-dimethoxy-propane (MBIP-DMP)

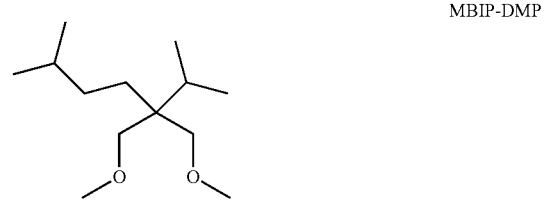

MBIP-DMP 2-(3-Methylbutyl)-2-isopropyl-1,3-dimethoxypropane (CAS 129228-11-1), alternatively named 3,3-Bis (methoxymethyl)-2,6-dimethylheptane or 1,3-Dimethoxy-2-isoamyl-2-isopropylpropane, was prepared according to the following procedure:

Diethyl Isopropylmalonate 45 g of Sodium hydride (1.12 mol, 1.2 eq.) were placed into an Argon-filled flask followed by 1 L of DMF. To this suspension, 150 g of Diethyl malonate (0.94 mol) were added dropwise at such a rate as to avoid violent hydrogen evolution (about 3 h). To an almost clear resultant solution, 191 g of Isopropyl iodide (1.12 mol, 1.2 eq.) were added drop-wise during 1 h. The temperature of the reaction mixture reached 50° C. and the mixture was cooled down to room temperature with water bath. At this moment, a thick suspension was formed due to precipitation of Sodium iodide. To provide effective stirring, 300 mL of DMF were added additionally and the reaction mixture was left stirring overnight with slow (one bubble a second) Argon flow to maintain inert atmosphere. 100 mL of 1M aq. HCl were added drop-wise to quench the reaction. The resultant solution was poured into additional 300 mL of 1M HCl and 1.5 L of water. The clear solution was separated on two 2 L portions and each was extracted with Hexane (200 mL, then 3×100 mL). Hexane extracts were combined, dried over Sodium sulphate, evaporated and distilled at reduced pressure to give 169 g (89%) of Diethyl isopropylmalonate as colourless oil.

Diethyl 2-isopentyl-2-isopropylmalonate

This stage was performed in a manner similar to the previous starting from Diethyl isopropylmalonate (174 g, 0.86 mol), Sodium hydride (45 g, 1.12 mol, 1.3 eq.) and Isoamyl bromide (182 g, 1.2 mol, 1.4 eq.) but without the addition of extra 300 mL of DMF.

A Vigreux column distillation at reduced pressure afforded 142 g (61%) of 2-Isopentyl-2-isopropylmalonate as colourless oil.

2-Isopentyl-2-isopropylpropane-1,3-diol

To a 2 L Argon-filled flask, 30.4 g of Lithium aluminium hydride (0.8 mol, 2 eq.) were added, followed by 1 L of THF. To this stirred suspension, 108 g of Diethyl 2-isopentyl-2-isopropylmalonate (0.4 mol) were added drop-wise during 3 h. After completion of the addition, the mixture was gently refluxed for 1 h and left stirred overnight under slow flow of Argon.

Quenching was then performed by drop-wise addition of water (30 mL), 15% aq. NaOH (30 mL) and water again (90 mL). The suspension was filtered; the filtrate volatiles were evaporated. Filtered aluminium material was dispersed in the solvent recovered from rotary evaporator, 100 mL of Methanol were added and the mixture was refluxed while stirring for 30 min, cooled to room temperature and filtered again. The filtrate was volatiles were removed and the resulting second portion of the product combined with the first portion.

Produced crude 2-Isopentyl-2-isopropylpropane-1,3-diol was purified by distillation at reduced pressure to give 60 g (80%) of 90+% purity material, which was used in subsequent methylation without additional purification.

2-(3-Methylbutyl)-2-isopropyl-1,3-dimethoxypropane

Into a 2 L Argon-filled flask, 40 g of Sodium hydride (1 mol, 2.5 eq.) were added followed by 1 L of THF. To this suspension, a mixture of crude 2-Isopentyl-2-isopropylpropane-1,3-diol (0.4 mol, 1 eq.), Methyl iodide (144 g, 1 mol, 2.5 eq.) and THF (100 mL) was added drop-wise within 2 h. After completion of the addition, the reaction was left stirred overnight. 5 g of Sodium hydride and 20 g of Methyl iodide were added additionally and reaction was refluxed for 2 h.

50 mL of concentrated aq. $NH_3$ were added and left stirred for 1 h to quench unreacted Methyl iodide. The solvent was removed in vacuo and the residue dissolved in 200 mL of water and extracted with Hexane (100 mL, followed by 2×50 mL). Organic extracts were combined, dried over Sodium sulphate, Solvent evaporated and the product distilled under reduced pressure to give 60 g of 2-(3-Methylbutyl)-2-isopropyl-1,3-dimethoxypropane (80%) as colourless oil.

$^1$H NMR (CDCl$_3$, 400 MHz): δ 3.27 (s, 6H), 3.24 (d, 4H), 1.75 (m, 1H), 1.42 (m, 1H), 1.30 (m, 2H), 1.13 (m, 2H), 0.87 (d, 6H), 0.85 (d, 6H).

$^{13}C\{^1H\}$ NMR (CDCl$_3$, 100 MHz): δ75.6, 59.1, 42.4, 32.6, 30.5, 29.3, 29.0, 22.7, 17.8.

ID2: 2-(3-Methylbutyl)-2-isopropyl-1,3-diethoxypropane (MBIP-DEP)

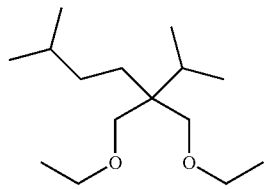

MBIP-DEP 2-(3-Methylbutyl)-2-isopropyl-1,3-diethoxypropane (CAS 180285-93-2), alternatively named 3,3-Bis(ethoxymethyl)-2,6-dimethylheptane, was acquired from SynphaBase AG.

ID3: 2-Nonyl-2-isopropyl-1,3-diethoxypropane (NIP-DEP)

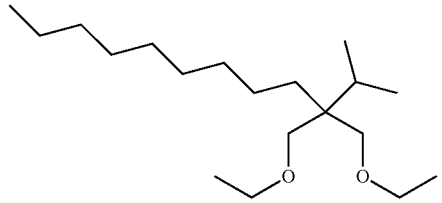

NIP-DEP

2-Nonyl-2-isopropyl-1,3-diethoxypropane (CAS 1443990-95-1), alternatively named 3,3-Bis(ethoxymethyl)-2-methyldodecane, was acquired from Convertex Chemie GmbH.

Inventive and Comparative Catalyst Components

Inventive catalyst components (IC1-IC3) and comparative catalyst components (CC1-a, CC1-b and CC2) were prepared according to the Reference Example 2 of WO2016/124676 A1, but using inventive donors (ID1-ID3) and comparative donors (CD1-CD2). Summary of donors used in catalyst component examples is disclosed in Table 1.

Comparative catalyst component CC3 is a catalyst commercially available from Grace under the trade name Lynx 200.

Raw Materials

The 10 wt % TEA (triethylaluminium) stock solutions in heptane were prepared by dilution of 100 wt % TEA-S from Chemtura.

$MgCl_2*3EtOH$ carriers were received from Grace.

$TiCl_4$ was supplied by Aldrich (metallic impurities <1000 ppm, Metals analysis >99.9%).

General Procedure for Catalyst Component Preparation

In an inert atmosphere glovebox a dry 100 mL, 4-neck round-bottom flask, equipped with two rubber septa, a thermometer and a mechanical stirrer, was charged with 3.1 mmol of a desired INTERNAL DONOR (INTERNAL DONOR and INTERNAL DONOR/Mg loading ratio is indicated in Tables 1 and 2) dissolved in 40 mL of heptane and with 7.01 g (30 mmol of Mg) of granular 17 μm ($D_{05}$) $MgCl_2*2.93EtOH$ carrier. The flask was removed from the glovebox, a nitrogen inlet and an outlet were connected. The flask was placed in a cooling bath and tempered at 0° C. for approximately 10 min at 250 rpm. Triethylaluminium 10 wt % solution in heptane (107.55 g, 94.2 mmol Al; Al/EtOH=1.07 mol/mol) was added drop-wise to the stirred suspension within 1 h, keeping the reaction mixture temperature below 0° C. The obtained suspension was heated to 80° C. within 20 min and kept at this temperature for further 30 min at 250 rpm. The suspension was left to settle for 5 min at 80° C. and the supernatant was removed using a cannula. The obtained pre-treated support material was washed twice with 70 mL of toluene at room temperature (adding toluene, stirring at 250 rpm for 15-120 min, settling for 5 min and siphoning the liquid phase off).

At room temperature, 70 mL of toluene was added to the pre-treated support material. To this suspension stirred at 250 rpm, neat $TiCl_4$ (3.31 mL, 30 mmol; Ti/Mg=1.0 mol/mol) was added drop-wise and the reaction mixture temperature was maintained between 25-35° C. The obtained suspension was heated to 90° C. within 20 min and stirred at this temperature for further 60 min at 250 rpm. The suspension was left to settle for 5 min at 90° C. and the supernatant was removed suing a cannula. The obtained catalyst was washed twice with 70 mL of toluene at 90° C. and once with 70 mL of heptane at room temperature (each wash involving adding toluene or heptane, stirring at 250 rpm for 15 min, settling for 5 min and siphoning the liquid phase off). The catalyst was dried in vacuo at 70° C. for 30 min.

TABLE 1

Summary of donors used in catalyst components CC1-a, CC1-b, CC2 and IC1-IC3

| Examples | Catalyst component | Internal Donor | Internal Donor short name |
|---|---|---|---|
| Comparative | CC1-a | CD1 | DMMF |
| Comparative | CC1-b | CD1 | DMMF |
| Comparative | CC2 | CD2 | DMDGP |
| Inventive | IC1 | ID1 | MBIP-DMP |
| Inventive | IC2 | ID2 | MBIP-DEP |
| Inventive | IC3 | ID3 | NIP-DEP |

Comparative Examples

CC1-a Preparation

CC1-a was prepared using the above General Procedure, with a difference that 0.778 g (3.1 mmol) of CD1 (DMMF) were used as internal donor (ID/Mg=0.102).

2.3 g (57.4% yield, Mg-basis) of CC1-a was isolated.

CC1-b Preparation

CC1-b was prepared using the above General Procedure, with a difference that 1.038 g (4.1 mmol) of CD1 (DMMF) were used as internal donor (ID/Mg=0.136).

2.8 g (64.5% yield, Mg-basis) of CC1-b were isolated.

CC2 Preparation

CC2 was prepared using the above General Procedure, with a difference that 0.66 g (3.1 mmol) of CD2 (DMDGP) were used as internal donor (ID/Mg=0.102).

5.4 g (89.6% yield, Mg-basis) of CC2 were isolated.

Inventive Examples

IC1 Preparation

IC1 was prepared using the above General Procedure, with a difference that 0.66 g (3.1 mmol) of ID1 (MBIP-DMP) were used as internal donor (ID/Mg=0.102).

3.8 g (80.8% yield, Mg-basis) of IC1 were isolated.

IC2 Preparation 102 was prepared using the above General Procedure, with a difference that 0.75 g (3.1 mmol) of ID2 (MBIP-DEP) were used as internal donor (ID/Mg=0.102).

4.3 g (89.6% yield, Mg-basis) of IC2 were isolated.

IC3 Preparation 103 was prepared using the above General Procedure, with a difference that 0.92 g (3.1 mmol) of ID3 (NIP-DEP) were used as internal donor (ID/Mg=0.102).

4.5 g (87.0% yield, Mg-basis) of IC3 were isolated.

TABLE 2

Summary of properties of catalyst components CC1-a, CC1-b, CC2 and IC1-IC3.

| Catalyst component | Internal donor (ID) | ID/Mg loading ratio, mol/mol | Ti, wt % | Mg, wt % | Al, wt % | Cl, wt % | Volatiles, wt % | Ti(IV) proportion, % | Mg/Ti ratio, mol/mol | Mg/Al ratio, mol/mol |
|---|---|---|---|---|---|---|---|---|---|---|
| CC1-a | DMMF | 0.102 | 3.54 | 18.2 | 0.23 | 56.3 | 4.7 | 40.0 | 10.13 | 87.85 |
| CC1-b | DMMF | 0.136 | 4.00 | 16.8 | 0.37 | 55.2 | 5.4 | 26.2 | 8.27 | 50.41 |
| CC2 | DMDGP | 0.102 | 9.16 | 12.1 | 1.56 | 55.3 | 7.0 | 15.2 | 2.60 | 8.61 |
| IC1 | MBIP-DMP | 0.102 | 5.56 | 15.5 | 0.38 | 58.1 | 4.7 | 12.4 | 5.49 | 45.28 |
| IC2 | MBIP-DEP | 0.102 | 6.37 | 15.2 | 0.49 | 56.1 | 6.1 | 13.5 | 4.70 | 34.44 |
| IC3 | NIP-DEP | 0.102 | 6.39 | 14.1 | 0.41 | 57.5 | 3.4 | 4.5 | 4.35 | 38.18 |

Bench-Scale Ethylene Copolymerization with 1-Butene

The inventive catalyst components (ID1-ID3) and comparative catalyst components (CC1-a, CC1-b, CC2 and CC3) were tested in copolymerization with 1-butene (IE1-IE3 and CE1-a, CE1-b, CE2 and CE3-a). Triethylaluminum (TEA) was used as a cocatalyst with an Al/Ti molar ratio of 15. The polymerization reaction was carried out in a 3 L bench-scale reactor in accordance with the following procedure:

An empty 3 L bench-scale reactor was charged with 70 mL of 1-butene at 20° C. and stirred at 200 rpm. Then 1250 mL of propane was added to the reactor as a polymerization medium, followed by the addition of hydrogen gas (0.40 bar). The reactor was heated to 85° C., and ethylene (3.7 bar) was added batch-wise. The reactor pressure was kept at 0.2 bar of overpressure and stirring speed was increased to 550 rpm. The catalyst component and the cocatalyst were added together (a few seconds of pre-contact between catalyst component and TEA) to the reactor with additional 100 mL of propane. The total reactor pressure was maintained at 37.8 bar by continuous ethylene feed. The polymerization was stopped after 60 min by venting off the monomers and $H_2$. The obtained polymer was left to dry in a fume hood overnight before weighing.

Additionally, the comparative catalyst component CC3 was tested in copolymerization also with 55 mL of 1-butene and 0.40 bar of hydrogen gas (CE3-b) and with 40 mL of 1-butene and 0.75 bar of hydrogen gas (CE3-c).

Polymerization Results

The results of the polymerization reactions are shown in Table 3. The activity of the catalysts was calculated based on catalyst component loading amount and the amount of polymer produced in one hour.

TABLE 3

Summary of polymerization results for comparative examples CE1-a, CE1-b, CE2, CE3-a-CE3-c and inventive examples IE1-IE3.

| Polymerization Example | Catalyst component | Activity, kg/(g * h) | 1-Butene content, wt % | $MFR_{21}$ g/10 min | Mw, g/mol | PDI | $T_M$, °C. |
|---|---|---|---|---|---|---|---|
| CE1-a | CC1-a | 19.2 | 4.4 | 3.7 | 211500 | 4.61 | 122.9 |
| CE1-b | CC1-b | 17.3 | 4.8 | 3.9 | 215500 | 4.52 | 123.2 |
| CE2 | CC2 | 20.0 | 5.2 | 10.6 | 163500 | 4.21 | 124.38 |
| CE3-a | CC3 | 55 | 6.2 | 5.3 | 200000 | 4.80 | 122.4 |
| CE3-b | CC3 | 54 | 4.8 | 3.0 | 220000 | 4.71 | 123.4 |
| CE3-C | CC3 | 58 | 3.9 | 8.3 | 160000 | 4.64 | 124.9 |
| IE1 | IC1 | 19.9 | 4.3 | 2.2 | 245000 | 4.12 | 122.2 |
| IE2 | IC2 | 23.5 | 3.7 | 2.0 | 242500 | 4.05 | 122.9 |
| IE3 | IC3 | 20.4 | 5.2 | 3.0 | 243500 | 4.18 | 122.4 |

Figure 2:
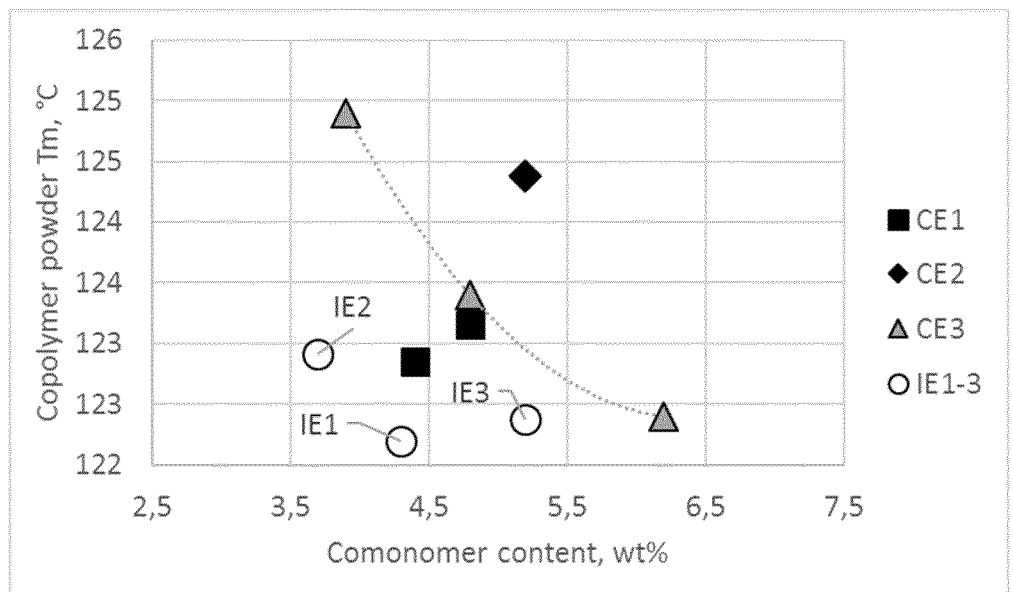
FIG. 2 shows the melting temperature vs. comonomer content inventive examples (IE1-IE3) and comparative examples CE1 and CE2.
Figure 3:
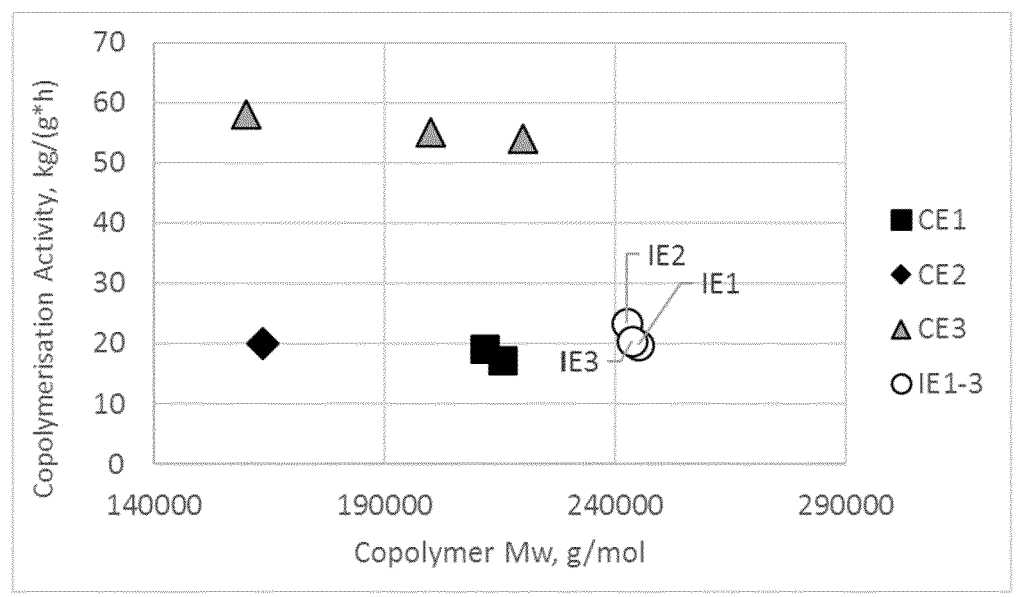
FIG. 3 shows activity level vs. molecular weight of inventive examples (IE1-IE3) and of comparative examples CE1 and CE2.

As can be seen form the results of the Table 3 and as indicated in FIGS. 1 to 3, all inventive examples (IE1-IE3) exhibit narrower MWD and higher average Mw than comparative examples CE1(a-b), CE2 and CE3(a-c).

Further (as shown in FIG. 2), all inventive examples (IE1-IE3) have a lower melting temperature at a given comonomer content than those of comparative examples CE2 and CE3(a-c), as well as a lower or similar melting temperature at a given comonomer content than those of comparative examples CE1(a-b).

In addition, as shown by the examples and in FIG. 3, all inventive examples (IE1-IE3) demonstrate an activity level similar to the comparative examples CE1(a-b) and CE2 but with higher $M_w$ capability.

Moreover, in all inventive examples (IE1-IE3) the desired balance of properties is achieved with ID/Mg loading ratios similar or lower than for comparative donor CD1.

To summarize the findings, all inventive examples IE1-IE3 demonstrate the highest (among the tested group of catalyst components/internal donors) $M_w$ combined with very narrow MWD and with low melting temperature at a given comonomer content. Thus, the inventive internal donors allow for "tailoring" of the properties of the produced polymers while maintaining catalyst productivity at an acceptably high level.

The invention claimed is:

1. A Ziegler-Natta catalyst component comprising an internal donor selected from compounds of formula (I)

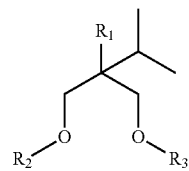

wherein $R_1$ is nonyl; and $R_2$ and $R_3$ are each independently $C_{1-3}$-alkyl.

2. The Ziegler-Natta catalyst component according to claim 1 further comprising:
   (ii) a compound of a transition metal Group 4 to 6 of the Periodic Table (IUPAC, Nomenclature of Inorganic Chemistry, 2005);
   (iii) a compound of metal Group 1 to 3 of the Periodic Table (IUPAC, 2005); and
   (iv) optionally, a compound of a element of Group 13 of the Periodic Table (IUPAC, 2005).

3. The Ziegler-Natta catalyst component according to claim 1 wherein the Ziegler-Natta catalyst component comprises:
   (ii) a Group 4 to 6 metal content (determined by ICP Analysis) in a range of 1.0 wt % to 15.0 wt % of a total weight of the Ziegler-Natta catalyst component;
   (iii) a Group 1 to 3 content (determined by ICP Analysis) in a range of 5.0 wt % to 30.0 wt % of the total weight of the Ziegler-Natta catalyst component;
   (iv) a Group 13 element content (determined by ICP Analysis) in a range of 0 wt % to 3.0 wt % of the total weight of the Ziegler-Natta catalyst component.

4. A Ziegler-Natta catalyst component according to claim 1, wherein the Ziegler-Natta catalyst component is prepared by a method comprising:

(M-a) providing a solid support;
(M-b) pre-treating the solid support of step (M-a) with a compound of Group 13 element, thereby generating a pre-treated solid support;
(M-c) treating the pre-treated solid support of step (M-b) with a transition metal compound of Group 4 to 6;
(M-d) recovering the Ziegler-Natta catalyst component;
wherein the solid support is contacted with one or more internal organic compounds of formula (I) before treating the solid support in step (M-c).

5. The Ziegler-Natta catalyst component according to claim 1, wherein compound of formula (I) is selected from compounds of formula (I-a) and (I-b)

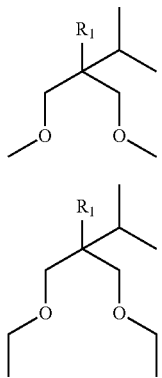

(I-a)

(I-b)

wherein
$R_1$ is nonyl.

6. A method for producing a Ziegler-Natta catalyst component according to claim 1, comprising adding an internal donor selected from compounds of formula

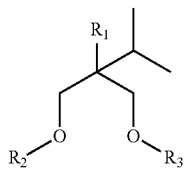

(I)

wherein
$R_1$ is nonyl; and
$R_2$ and $R_3$ are each independently $C_{1-3}$-alkyl,
to a constituent step of the method for preparing the Ziegler-Natta catalyst component.

7. A Ziegler-Natta catalyst for ethylene (co) polymerization, wherein the Ziegler-Natta catalyst comprises:
(A) the Ziegler-Natta catalyst component as defined in claim 1;
(B) a cocatalyst selected from element compounds of Group 13 of the Periodic Table (IUPAC, 2005); and
(C) optionally, an external donor.

8. A method of ethylene (co) polymerization optionally with $C_{3-20}$ comonomers, comprising:
a) introducing into a polymerization reactor a Ziegler-Natta catalyst component comprising an internal donor of formula (I)

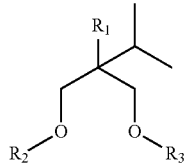

(I)

wherein
$R_1$ is nonyl; and
$R_2$ and $R_3$ are each independently linear or branched $C_{1-3}$-alkyl.

9. The method as claimed in claim 8, wherein the internal donor of formula (I) is selected from compounds of formula (I-a) or (I-b)

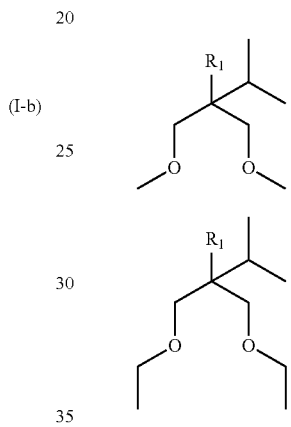

(I-a)

(I-b)

wherein
$R_1$ is nonyl.

10. The method according to claim 8, wherein the internal donor is comprised in a Ziegler-Natta catalyst component further comprises:
(ii) a transition metal compound of Group 4 to 6 of the Periodic Table (IUPAC, Nomenclature of Inorganic Chemistry, 2005);
(iii) a metal compound of Group 1 to 3 of the Periodic Table (IUPAC, 2005); and
(iv) optionally, a compound of group 13 of the Periodic Table (IUPAC, 2005).

11. A process for producing an ethylene homo- or copolymer, comprising:
(P-a) introducing a Ziegler-Natta catalyst component, comprising:
(i) an internal donor selected from compounds of formula (I), or from formulas (I-a) and (I-b)

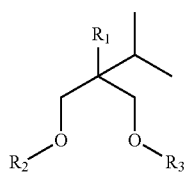

(I)

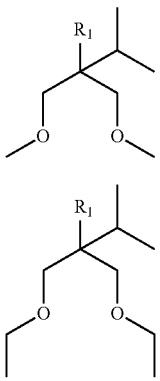

wherein
R₁ is nonyl; and
R₂ and R₃ are each independently linear or branched $C_{1-3}$-alkyl;
  (ii) a transition metal compound of Group 4 to 6 of the Periodic Table (IUPAC, Nomenclature of Inorganic Chemistry, 2005);
  (iii) a metal compound of Group 1 to 3 of the Periodic Table (IUPAC, 2005); and
  (iv) optionally, a compound of group 13 of the Periodic Table (IUPAC, 2005)
into a polymerisation reactor,
  (P-b) introducing a cocatalyst that activates the Ziegler-Natta catalyst component into the polymerisation reactor;
  (P-c) introducing ethylene, optionally $C_3$-$C_{20}$ α-olefin comonomers, and optionally hydrogen into the polymerisation reactor; and
  (P-d) maintaining said polymerisation reactor in such conditions as to produce an ethylene homo- or copolymer.

12. The process according to claim 11, wherein (co) polymerizing ethylene is accomplished in a multi-stage polymerization process comprising at least one gas phase reactor for producing ethylene (co) polymers.

13. The process according to claim 11, wherein (co) polymerizing ethylene is accomplished in a multi-stage polymerization process comprising at least one slurry reactor, and one gas phase reactor.

* * * * *